United States Patent
Martin Regalado et al.

(10) Patent No.: US 10,606,005 B1
(45) Date of Patent: Mar. 31, 2020

(54) OPTICAL CABLES HAVING AN INNER SHEATH ATTACHED TO A METAL TUBE

(71) Applicant: Prysmian S.p.A., Milan (IT)

(72) Inventors: Josep Maria Martin Regalado, Barcelona (ES); Josep Oriol Vidal Casanas, Barcelona (ES); Matias Campillo Sanchez, Barcelona (ES); Ester Castillo Lopez, Barcelona (ES)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 16/129,481

(22) Filed: Sep. 12, 2018

(51) Int. Cl.
| | | |
|---|---|---|
| *G02B 6/43* | (2006.01) | |
| *G02B 6/44* | (2006.01) | |
| *H01B 9/02* | (2006.01) | |
| *H01B 13/22* | (2006.01) | |
| *H01B 9/00* | (2006.01) | |

(52) U.S. Cl.
CPC .......... *G02B 6/443* (2013.01); *G02B 6/4436* (2013.01); *G02B 6/4488* (2013.01); *H01B 9/005* (2013.01); *H01B 9/02* (2013.01); *H01B 13/22* (2013.01)

(58) Field of Classification Search
CPC ...... G02B 6/443; G02B 6/4436; H01B 9/005; H01B 13/22; H01B 9/02
See application file for complete search history.

(56) References Cited

U.S. PATENT DOCUMENTS

| | | | | |
|---|---|---|---|---|
| 3,717,719 A | * | 2/1973 | Smith | H01B 7/14 174/107 |
| 4,479,702 A | * | 10/1984 | Pryor | G02B 6/4488 264/1.28 |
| 4,522,464 A | * | 6/1985 | Thompson | G02B 6/4427 385/107 |
| 4,679,898 A | * | 7/1987 | Grooten | G02B 6/4416 174/105 R |
| 4,711,388 A | * | 12/1987 | Winter | B23K 1/16 228/148 |
| 4,952,012 A | * | 8/1990 | Stamnitz | G02B 6/4416 385/101 |
| 5,125,061 A | * | 6/1992 | Marlier | G02B 6/4416 174/70 R |
| 5,263,239 A | * | 11/1993 | Ziemek | G02B 6/4427 156/244.12 |
| 5,700,990 A | * | 12/1997 | Marlier | B23K 26/0846 219/121.64 |
| 5,760,364 A | * | 6/1998 | Marlier | G02B 6/4488 219/121.63 |
| 5,787,217 A | * | 7/1998 | Traut | G02B 6/4411 385/100 |

(Continued)

FOREIGN PATENT DOCUMENTS

EP        0371660 A1    6/1990

OTHER PUBLICATIONS

Draka Comteq, Cable Solutions EMEA, FR Circuit Integrity, Reference: 100, Jul. 4, 2008, 3 pages, http://www.pns.by/download_files/brands/draka/ind_op2_I_gm_gmnwg.pdf.

(Continued)

*Primary Examiner* — Akm E Ullah
(74) *Attorney, Agent, or Firm* — Slater Matsil, LLP (57) ABSTRACT

An optical cable includes a plurality of optical fibers sealed within a metal tube, a polymer inner sheath surrounding the metal tube and operatively connected to the metal tube, and an outer sheath disposed over the polymer inner sheath.

23 Claims, 9 Drawing Sheets

(56) References Cited

U.S. PATENT DOCUMENTS

| | | | | |
|---|---|---|---|---|
| 6,552,112 | B1* | 4/2003 | Redondo | C08K 3/22 |
| | | | | 174/110 SR |
| 8,901,426 | B2* | 12/2014 | Grizante Redondo | ..................... |
| | | | | C08L 23/04 |
| | | | | 174/121 A |
| 9,151,919 | B2* | 10/2015 | Consonni | G02B 6/4433 |
| 2008/0031578 | A1* | 2/2008 | Varkey | E21B 47/123 |
| | | | | 385/100 |
| 2010/0014818 | A1* | 1/2010 | Sales Casals | G02B 6/4484 |
| | | | | 385/100 |
| 2010/0278491 | A1* | 11/2010 | Noddings | G02B 6/443 |
| | | | | 385/100 |
| 2016/0169711 | A1* | 6/2016 | Blakley | G01K 1/08 |
| | | | | 374/137 |

OTHER PUBLICATIONS

Prysmian Group, Oil & Gas—Cable Solutions, Pipelines & LNG—Onshore, Fiber Optic Cables, Nov. 29, 2017, 3 pages, https://www.prysmiangroup.com/sites/default/files/atom/files/01%20datasheetCS_%20FO%20ONSHORE%20ALPA_P%26LNG_FINAL.pdf.

* cited by examiner

OPTICAL CABLES HAVING AN INNER SHEATH ATTACHED TO A METAL TUBE

TECHNICAL FIELD

The present invention relates generally to optical cables, and, in particular embodiments, to optical cables capable of maintaining operation in harsh environments.

BACKGROUND

Optical fibers are glass strands capable of transmitting an optical signal over great distances, at very high speeds, and with relatively low signal loss relative to standard copper wire networks. Optical cables are therefore widely used in long distance communication and have replaced other technologies such as satellite communication, standard wire communication etc. Besides long distance communication, optical fibers are also used in many applications such as medicine, aviation, computer data servers, etc.

Due to the broad range of applications for optical fibers, optical cables may need to be capable of operation in harsh environments. For example, optical cables may be used in harsh environments where high chemical resistance is needed such as in ducts, refineries such as oils and gas plants, mining operations, and the like. Optical cables may also be relied upon to maintain functionality for safety reasons during disaster events. For instance, optical cables may need to be flame retardant, fire resistant, and maintain circuit integrity for as long as possible during a fire. In addition, the performance of optical cables may be adversely affected by pressure events such as bending, buckling, and compressive stresses. For these reasons, optical cables that are resistant to chemicals, fire, and/or mechanical stresses may be desirable.

Optical cables may also be used in applications where electrical signals and/or electrical power are desirable in addition to an optical signal. A hybrid cable may include electrically conductive pathways as well as optical pathways in an integrated cable solution. For example, optical devices and electronic equipment such as machinery, sensors, communication devices, and others may be fed by a hybrid cable. Hybrid cables have been described previously in the art.

A fiber-optic transmission cable for high-stress environments and especially undersea applications is described by Stamnitz in European Patent Publication No. EP0371660A1. The fiber-optic transmission cable comprises one to a large number of optical fibers, electrical conductors, and metallic wire strength members contained within a single cable structure. A specific example is an electro-opto-mechanical cable that includes at least one thin-wall steel alloy tube containing at least one single mode fiber and a void filling gel. A dielectric annulus includes an electrically conductive layer disposed therein. An optional double-layer contrahelical or three or four layer, torque balanced, steel wire strength member provides additional protection as well as capability to be towed, deployed and recovered from the seafloor at abysmal depths.

An undersea telecommunications cable is described by Marlier et al. in U.S. Pat. No. 5,125,061. The undersea telecommunications cable has optical fibers embedded in a material filling a tube which itself lies inside a helical lay of metal wires having high mechanical strength and in which the interstices are filled with a sealing material. The cable includes a first extruded sheath between the tube and the helical lay, and the helical lay is itself covered by a second extruded sheath which is insulating and abrasion resistant, and if the cable is for a remotely-powered link, it includes a conductive strip on the tube or on the first sheath.

SUMMARY

In accordance with an embodiment of the invention, an optical cable includes a plurality of optical fibers sealed within a metal tube, a polymer inner sheath surrounding the metal tube and operatively connected to the metal tube, and an outer sheath surrounding disposed over the polymer inner sheath. In an embodiment, a single layer of armor is disposed between the polymer inner sheath and the outer sheath.

In accordance with another embodiment of the invention, an optical cable includes an optical core comprising a metal tube enclosing a plurality of loose optical fibers. The optical core is configured to resist water penetration. The optical cable further includes a single layer homogeneous inner sheath disposed over and operatively connected to the optical core and an outer sheath. The single layer homogeneous inner sheath is configured to be chemically resistant. The optical cable may also include an armor layer disposed over and physically contacting the single layer homogeneous inner sheath, and the outer sheath disposed over the armor layer. The outer sheath is configured to be flame retardant.

In accordance with still another embodiment of the invention, a hybrid cable includes a plurality of optical fibers sealed within a metal tube and a polyamide inner sheath surrounding the metal tube. The polyamide inner sheath is directly attached to the metal tube. The hybrid cable further includes a conductive layer disposed over and physically contacting the polyamide inner sheath, an intermediate sheath disposed over the conductive layer, and an outer sheath surrounding the intermediate sheath. An armor layer may be disposed between the intermediate sheath and the outer sheath. The hybrid cable is configured to transmit optical signals through the plurality of optical fibers. The hybrid cable is further configured to conduct electrical current through the conductive layer.

In accordance with yet another embodiment of the invention, a method of fabricating an optical cable includes providing a plurality of optical fibers, sealing the plurality of optical fibers within a metal tube, forming a polymer inner sheath surrounding the metal tube and operatively connected to the metal tube, and forming an outer sheath to surround over the polymer inner sheath. In an embodiment, the method further comprises forming a single layer of armor over the polymer inner sheath before forming the outer sheath.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In various embodiments, an optical cable with high chemical resistance, fire resistance, flame retardancy, circuit integrity, and mechanical strength will be described. The optical cable achieves these and other properties by including a chemically resistant layer directly contacting a metal tube that houses optical fibers. The following description describes the exemplary embodiments.

Two conventional optical cables will first be described using FIGS. 1 and 2. Two embodiment optical cables will then be described using FIGS. 3 and 4. Two embodiment hybrid cables will then be described using FIGS. 5 and 6. Several exemplary methods of fabricating embodiment cables will then be described using FIGS. 7-9. A selection of possible cable diameters and cable diameter ranges will be summarized in Table I.

Figure 1:
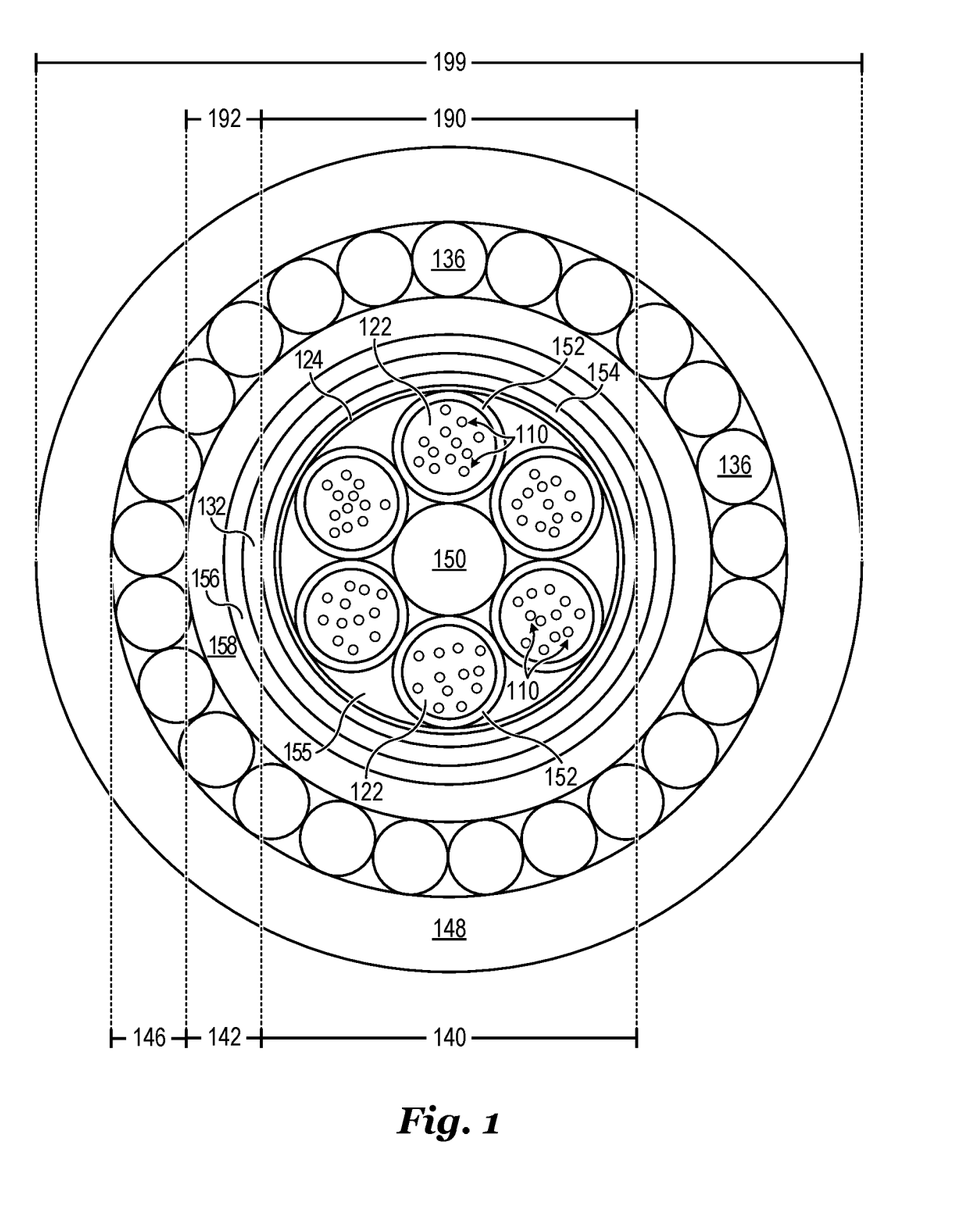
FIG. 1 illustrates a conventional optical cable.

FIG. 1 illustrates a conventional optical cable.

Referring to FIG. 1, a conventional optical cable 100 includes a glass fiber reinforced plastic (GFRP) central element 150. Thermoplastic polyester tubes 152 are arranged around the GFRP central element 150. Each of the thermoplastic polyester tubes 152 contains a plurality of optical fibers 110 and a gel compound 122. The conventional optical cable has 72 optical fibers 110 contained in six thermoplastic polyester tubes 152 as illustrated in FIG. 1.

The thermoplastic polyester tubes 152 are surrounded by a heat resistant and swellable core covering 124. The heat resistant and swellable core covering 124 comprises a mica tape for heat resistance and an absorbent powder for water protection. The heat resistant and swellable core covering 124 is surrounded by a low smoke zero halogen (LS0H) layer 154. The GFRP central element 150, thermoplastic polyester tubes 152, the heat resistant and swellable core covering 124, and the LS0H layer 154 make up a cable core 140 of the conventional optical cable 100.

The cable core 140 has a conventional core diameter 190 determined as a function of the number and arrangement of the optical fibers within the thermoplastic polyester tubes 152. The total number of optical fibers typically ranges from 6 to 96. The conventional core diameter 190 has a minimum diameter 6.5 mm for 6 to 36 optical fibers. The diameter increases as the number of optical fibers increases. A conventional optical cable 100 including 72 optical fibers has a conventional core diameter 190 of 7.4 mm. Similarly, a conventional optical cable 100 including 96 optical fibers has a conventional core diameter 190 of 9 mm.

The cable core 140 is covered by a multilayer inner sheath 142 in a radially outer position with respect to LS0H layer 154. The multilayer inner sheath 142 has an aluminum foil 132, a high density polyethylene (HDPE) layer 156, and a polyamide (PA) layer 158. The PA layer 158 is made of polyamide 12 (also referred to as PA12). The multilayer inner sheath 142 has a conventional inner sheath diameter 192 which is limited by the number of layers included in multilayer inner sheath 142 as well as minimum protection requirements. In order to protect the conventional optical cable 100, the conventional inner sheath diameter 192 cannot be less than 6.9 mm.

An armor layer 146 is disposed on the multilayer inner sheath 142. The armor layer 146 consists of one layer of galvanized steel wires 136. An LS0H outer sheath 148 covers the armor layer 146. Conventional optical cable 100 has a conventional optical cable diameter 199 which includes the LS0H outer sheath 148. Since the cable core 140 is also included, the conventional optical cable diameter 199 is subject to the same limitations as the conventional core diameter 190. A conventional optical cable 100 with a total number of optical fibers in the range of 6 to 36 optical fibers has a conventional optical cable diameter 199 of 19.8 mm. A conventional optical cable 100 with 72 optical fibers has a conventional optical cable diameter 199 of 20.7 mm. Similarly, a conventional optical cable 100 with 96 optical fibers has a conventional optical cable diameter 199 of 22.3 mm.

Figure 2:
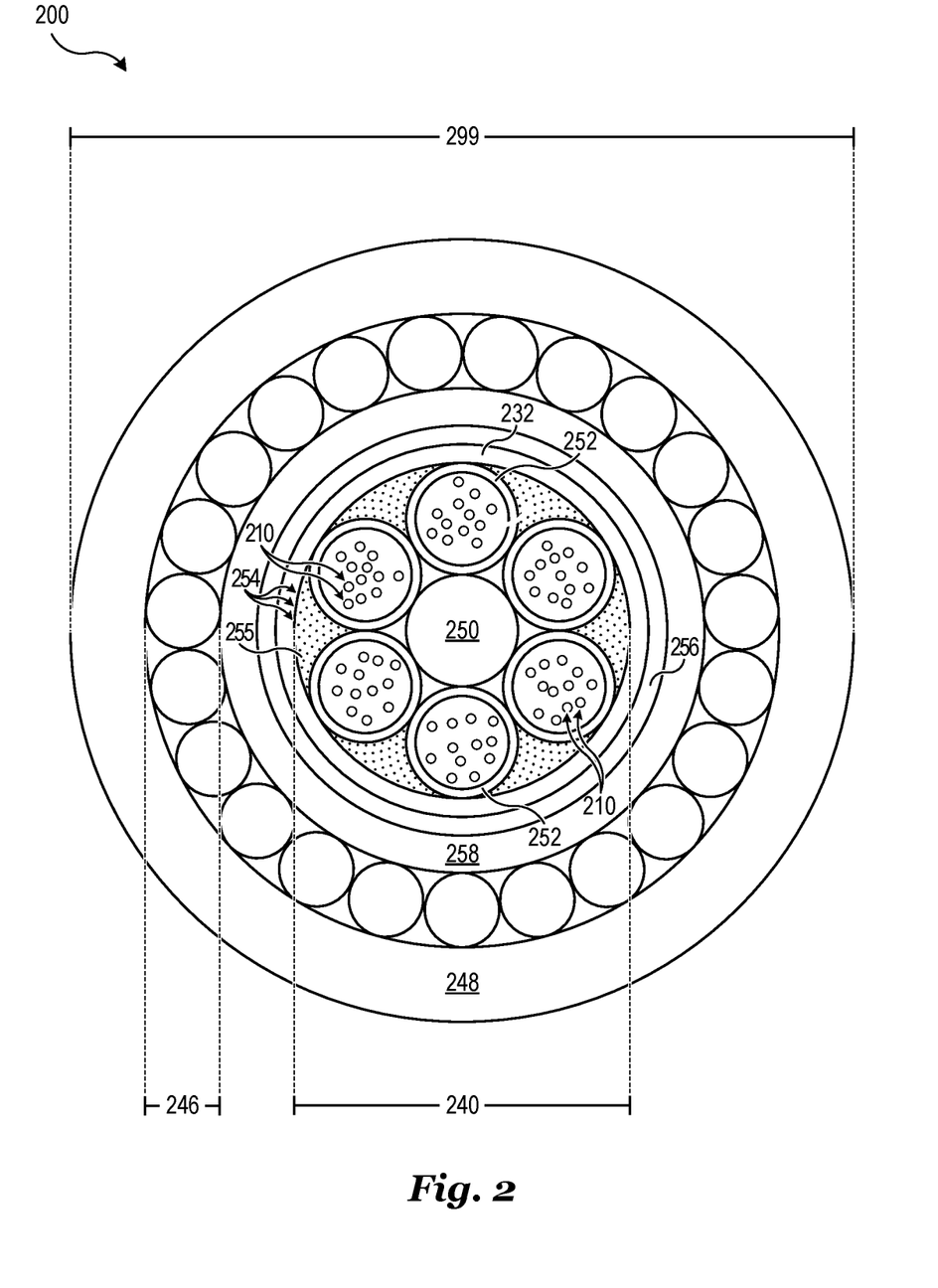
FIG. 2 illustrates another conventional optical cable.

FIG. 2 illustrates another conventional optical cable.

Referring to FIG. 2, a conventional optical cable 200 has a central strength member 250. Fibers 210 are protected in gel-filled loose tubes 252 stranded around the central strength member 250. A moisture barrier 232 is made of aluminum copolymer tape that is longitudinally folded around the loose tubes 252. A subunit jacket 256 made of high density polyethylene (HDPE) is arranged over the moisture barrier 232. A polyamide jacket 258 is arranged around the subunit jacket 256. An armor 246 consisting of steel wires, steel wire braids, or corrugated steel tape is formed around the polyamide jacket 258. A sheath 248 consisting of low smoke, zero halogen, flame retardant material or PVC flame retardant and heat and oil resistant material is formed around the armor 246.

The conventional optical cable 200 has a conventional optical cable diameter 299 subject to the same limitations as the optical core 240 in a manner similar to conventional optical cable 100. The conventional optical cable diameter 299 cannot be less than 18.0 mm when the conventional optical cable 200 has a total number of optical fibers in the range of 2 to 72 optical fibers. A conventional optical cable 200 with 96 optical fibers has a conventional optical cable diameter 299 of 19.6 mm. A conventional optical cable 200 with 144 optical fibers has a conventional optical cable diameter 299 of 23.4 mm.

Several disadvantages may be associated with conventional optical cables. For example, conventional optical cables are relatively thick. Both conventional optical cable 100 and conventional optical cable 200 need to have a GFRP central strength member which increases the diameter of the optical core and consequently the diameter of the conventional optical cable. This is because filler tubes containing no optical fibers are included to maintain structural integrity of the cable even when fewer tubes containing optical fibers are needed. Additionally, the multilayer inner sheath of conventional optical cable 100 and conventional optical cable 200 increases the total diameter of the cable.

Another disadvantage of conventional optical cables like cable 100 is the use of mica tape to provide fire resistance. Mica tape complicates manufacturing process flows by requiring that the conventional optical cable be moved to another line to wind the mica tape. The additional processing increases manufacturing costs by increasing manufacturing time and requiring additional machinery. Mica tape is formed by gluing mica flakes onto a glass fiber substrate, and is therefore very fragile. Mica flakes easily peel off during processing which disadvantageously pollutes the working environment. In addition, mica tape is relatively expensive which further increases costs. Cable 200, not comprising mica tapes, is not suitable for maintaining circuit integrity under fire according to IEC 60331-25 (1999).

Conventional optical cables also cannot meet all of the protection requirements for certain harsh environments such as those found in the oil and gas industry. For example, optical cables designed for chemically challenging environments such as mines and oil wells have to be simultaneously water resistant, fire resistant, flame retardant, chemically resistant, mechanically stable, and maintaining circuit integrity during a fire. Conventional optical cables disadvantageously lack one or more protection requirements so as to render them unsuitable for use in these harsh environments such as in the oil and gas industry.

Furthermore, it may be desirable to provide electrical connectivity in addition to optical connectivity within a single cable. For example, electrical signals and/or power may be transmitted concurrently within a single optical cable. Electrical power may be advantageous to power remote machinery or sensors, for example. However, conventional optical cables disadvantageously only provide optical connectivity.

The inventors of the present application have found that conventional optical cables fail to meet protection requirements such as fire resistance and circuit integrity in the presence of fire. Furthermore, the inventors of the present application have found that conventional optical cables cannot be made thinner and less expensive while still meeting the protection requirements for harsh environments such as those found in the oil and gas industry. The inventors of the present application also recognize an unmet need in the industry of providing electrical signals and/or power in addition to optical signals using a single cable suitable for use in these harsh environments.

Figure 3:
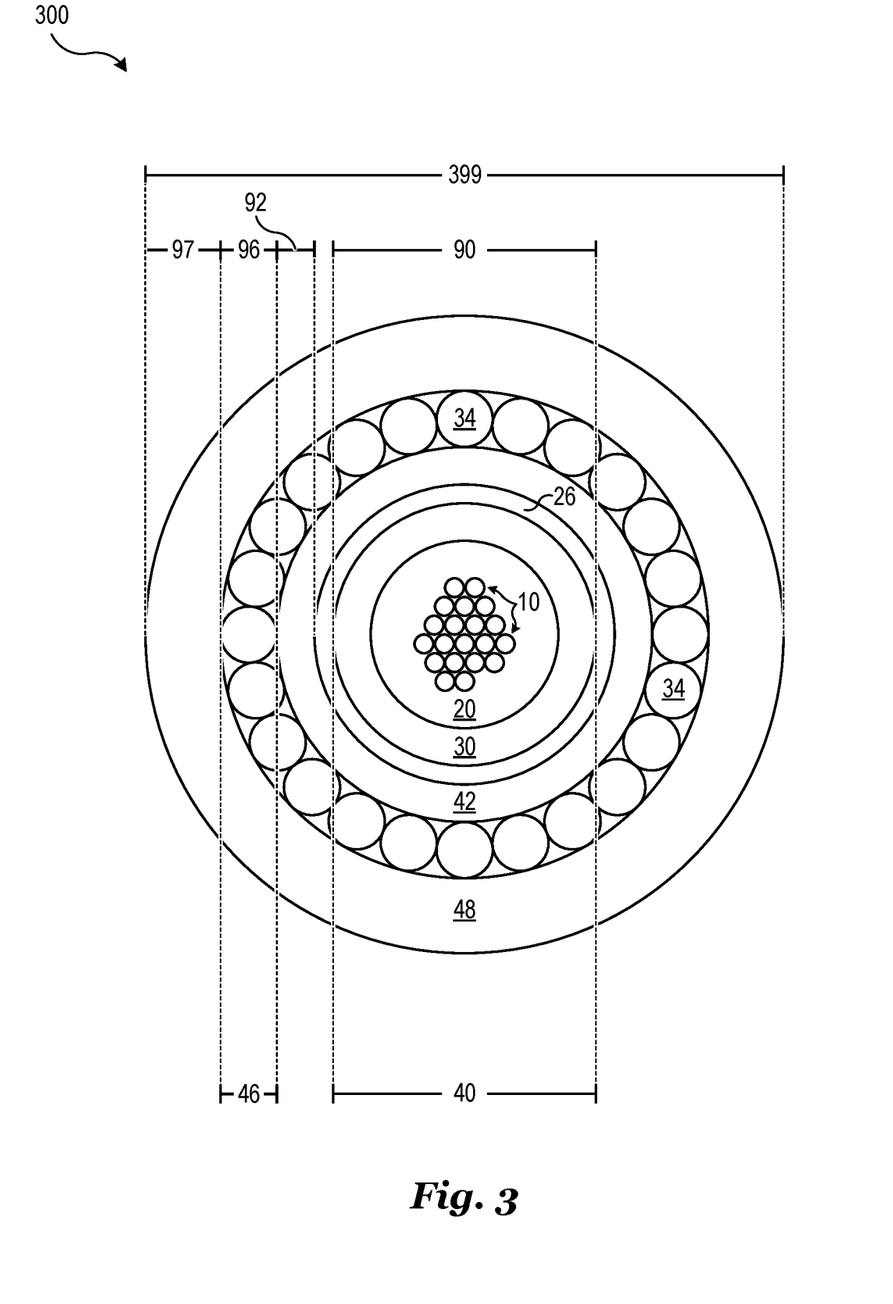
FIG. 3 illustrates an exemplary optical cable including a single layer inner sheath directly adjacent to a sealed metal tube containing a plurality of optical fibers in accordance with an embodiment of the invention.

FIG. 3 illustrates an exemplary optical cable according to the present disclosure including a single layer inner sheath directly adjacent to a sealed metal tube containing a plurality of optical fibers in accordance with an embodiment of the invention.

Referring to FIG. 3, an optical cable 300 includes a plurality of optical fibers 10 sealed within a metal tube 30. Any conceivable number of optical fibers may be sealed within the metal tube 30. In various embodiments, the number of optical fibers 10 within the metal tube 30 is less than 150. However, the number of optical fibers 10 within the metal tube 30 may also equal or exceed 150. In one embodiment, the number of optical fibers 10 within the metal tube 30 is 48. In another embodiment, the number of optical fibers 10 within the metal tube 30 is 12. In still another embodiment, the number of optical fibers 10 within the metal tube 30 is 96.

A fill material 20 may be included to fill empty space and partially or completely immobilize the optical fibers 10 within the metal tube 30. The fill material 20 may be configured to prevent the propagation of moisture in a longitudinal direction along the optical cable 300. For example, the fill material 20 may include a waterblocking compound. The fill material may also include a hydrogen scavenger. In various embodiments, the fill material 20 includes an absorbent material for absorbing moisture and water, and includes a super absorbent powder in some embodiments. In other embodiments, the fill material 20 includes a gel and is a thixotropic gel in some embodiments. In various embodiments, the fill material 20 is a flooding compound for preventing longitudinal moisture propagation within the metal tube 30. Examples of materials suitable as fill material according to the present disclosure are hydrotreated heavy paraffines, hydrotreated neutral C20-50 oils, and polydimethylsiloxane oils. Water-blocking yarns bearing, for example polyacrylate and/or polyacrylamide powder, may also or alternatively be used.

In various embodiments, the metal tube 30 may be welded or extruded, if possible. The metal tube 30 may be of steel, for example of stainless steel such as 304 or 304 L stainless steel, or 316 or 316 L stainless steel. The metal tube 30 may also be implemented using other metals or metal alloys. In one alternative embodiment, the metal tube 30 is elemental copper (Cu) and is a welded copper tube in one embodiment. In other embodiments, the metal tube 30 is a copper alloy and is a welded copper alloy tube in one embodiment. In various embodiments, the metal tube 30 is aluminum and is a welded aluminum tube in one embodiment. Alternatively, metal tube 30 may be formed from extruded aluminum. When the metal tube 30 is made of copper, copper alloy or aluminum, it can also carry electric current, as requested by the specific cable application.

The metal tube 30, fill material 20, and plurality of optical fibers 10 comprise an optical core 40 of the optical cable 300. Although the plurality of optical fibers 10 may be partially or completely immobilized by the fill material 20, the configuration as illustrated in FIG. 3 may be referred to as a loose tube core configuration. A possible advantage of this configuration is that the metal tube 30 may provide mechanical stability so that a central strength member is unnecessary. Since the metal tube 30 is sealed by welding or extrusion, it may also function to prevent water ingress into the optical core 40. Specifically, the metal tube 30 may prevent radial water penetration into optical core 40.

Still referring to FIG. 3, the optical cable 300 further includes an inner sheath 42 surrounding the metal tube 30. In various embodiments, the inner sheath 42 is formed from a single layer of homogeneous polymer material and is a polyamide material in some embodiments. In other embodiments, inner sheath 42 may include two or more layers. Inner sheath 42 may also be implemented using other materials such as polyethylene (PE), as an example. Inner sheath 42 may be configured to protect optical core 40 from harsh chemicals. A possible advantage of inner sheath 42 is that sufficient protection from chemicals such as oil, fuel, toluene, water, and others may be obtained using a single layer of material. Consequently, inner sheath 42 may advantageously be thinner, less expensive, and simpler to fabricate than conventional layers configured to protect an optical core.

When made of polyamide, the inner sheath of the cable of the disclosure was found to be resistant to chemicals such as sodium hydroxide at room temperature, toluene at 50° C., benzene at 50° C., diesel fuel at 50° C., ASTM reference oil 902 at 75° C. and 100° C., ASTM reference oil 903 at 100° C. and 140° C., the inner sheath being tested according to IEC 60811-2-1 (2001).

In one embodiment, inner sheath 42 is implemented using a single homogeneous layer of nylon 6 (also referred to as PA6). Specifically, nylon 6 has the chemical formula $[NH-(CH_2)_5-CO]_n$ as a repeated unit. For example, as described below, the inventors have found that nylon 6 may be used to form inner sheath 42 in order to advantageously provide chemical protection while minimizing the thickness of inner sheath 42. In another embodiment, inner sheath 42 is implemented using a single homogeneous layer of nylon 12 (also referred to as PA12). Specifically, nylon 12 has the chemical formula $[NH-(CH_2)_{11}-CO]_n$ as a repeated unit. Other types of nylon may also be used for inner sheath 42 such as nylon 6,6. Similarly, other polyamide materials may also be used for inner sheath 42. In some applications, other materials such as other polymer materials may also be included in inner sheath 42.

An optional adhesion layer 26 may be disposed between the metal tube 30 and the inner sheath 42. The adhesion layer 26 may be configured to facilitate bonding of the inner sheath 42 directly to the metal tube 30. The adhesion layer 26 may also be configured to act as a primer by preparing the outer surface of the metal tube 30 to be bonded to the inner sheath 42. In various embodiments, the adhesion layer 26 completely fills the space between metal tube 30 and inner sheath 42. As a result, adhesion layer 26 may also function to prevent or reduce longitudinal water penetration. Suitable adhesives for the cables of the present disclosure are based, for example, on polyamide or polyethylene, optionally admixed with acrylic acid or acrylate polymers.

Optical cable 300 also includes an armor layer 46 surrounding the inner sheath 42. The armor layer 46 includes a metal in various embodiments. In one embodiment, armor layer 46 is a single layer of armor. Implementing armor layer 46 as a single layer of armor may advantageously enable a smaller overall diameter of optical cable 300. Armor layer 46 may be implemented using a plurality of round wires 34. In some embodiments, armor layer 46 includes stainless steel and in one embodiment is implemented using round galvanized steel wires (SWA) wound in a closed helix around inner sheath 42. Alternatively, armor layer 46 may comprise other types of metal such as steel phosphate, stainless steel, aluminum clad steel, elemental copper (Cu), elemental aluminum (Al), metal alloys, and the like.

The shape of the elementary components of armor layer 46 is not limited to round wires. Armor layer 46 may also be implemented using corrugated tape, trapezoidal wires, or flat wires. Further, armor layer 46 may also be implemented using dielectric strength members such as round glass strength members or flat glass strength members or round aramid wires. Armor layer 46 may also include additional layers.

Referring again to FIG. 3, the optical cable 300 further includes an outer sheath 48 around the armor layer 46. The outer sheath 48 may be advantageously configured to provide substantial fire resistance and flame retardancy. The outer sheath 48 may also advantageously be heat, oil, and UV resistant. The outer sheath 48 may optionally produce low smoke and zero halogens in the presence of fire. In some embodiments, the outer sheath 48 is implemented using an LS0H material as described, for example, in U.S. Pat. No. 6,552,112 which is incorporated herein by reference in its entirety. Specifically, the LS0H material may comprise, for example, (a) a crystalline propylene homopolymer or copolymer; (b) a copolymer of ethylene with at least one alpha-olefin, and optionally with a diene; and (c) natural magnesium hydroxide in an amount such as to impart flame-retardant properties. In other embodiments, the outer sheath 48 maybe implemented using a PVC material or an HDPE material.

Several representative dimensions of the optical cable 300 are shown in FIG. 3. The optical core 40, which includes the metal tube 30, the plurality of optical fibers 10, and optionally the fill material 20, has a first optical core diameter 90. The first optical core diameter 90 may depend on the number of optical fibers 10 contained within. First optical core diameter 90 may further depend on the thickness of metal tube 30 as well as the presence of additional structural and organizational components included to arrange the plurality of optical fibers 10. For example, the thickness of metal tube 30 may be between 0.1 mm and 0.5 mm and is 0.4 mm in one embodiment. A possible benefit of the metal tube 30 including loose packed optical fibers 10 is that the first optical core diameter 90 is decreased in comparison to conventional optical cores because of reasons described below in more detail.

In various embodiments, the first optical core diameter 90 is between 1.5 mm and 5.5 mm. In one embodiment, the first optical core diameter 90 is about 2 mm. As a specific example, an optical core 40 including 12 optical fibers may have a first optical core diameter 90 of 2 mm. In other embodiments, the first optical core diameter 90 is about 3.5 mm. As a specific example, an optical core 40 including 13 to 48 optical fibers may have a first optical core diameter 90 of 3.5 mm. In still other embodiments, the first optical core diameter 90 is about 4.8 mm. As a specific example, an optical core 40 including 49 to 96 optical fibers may have a first optical core diameter 90 of 4.8 mm. Other combinations of optical core diameters and numbers of optical fibers are possible. The first optical core diameter 90 may generally increase as the number of optical fibers increases, but this is not necessarily true in all cases.

In contrast to conventional optical cables designed to be fire resistant and maintain circuit integrity in the presence of fire, optical cable 300 may not include any fire resistant layer other than metal tube 30 around the optical core 40. For example, conventional optical cables typically utilize a fire resistant tape such as mica tape to achieve the requirements of fire resistant circuit integrity standards such as International Electrotechnical Commission (IEC) 60331-25 (1999). Conventional cables that do not employ some type of heat resistant tape do not pass the IEC 60331-25 (1999) standard.

The inventors of the present application have found that a metal tube such as the metal tube 30 provides sufficient protection for the optical fibers to maintain circuit integrity during a fire. Specifically, the inventors have conducted circuit integrity tests on cables comprising stainless steel tubes containing unbuffered optical fibers with good results. The cable of the present disclosure successfully passed the circuit integrity tests at 750° C. for 90 min and at 1000° C. for 180 min according to IE C 60331-25 (1999) and at 830° C. for 120 min under impacts according to CEI EN50200 (2015). This finding may be counterintuitive based on known methods and configurations because the optical fibers may be expected to become overheated because of the high thermal conductivity of most metals. Advantageously, using a metal tube containing loose optical fibers may decrease the optical core diameter of embodiment optical and hybrid cables while still maintaining high levels of fire resistance and circuit integrity in the presence of fire.

The inner sheath 42 has a first inner sheath thickness 92. In various embodiments, the first inner sheath thickness 92 is between 0.4 mm and 3 mm and may range from about 0.3 mm to about 1.5 mm is some embodiments. In one embodiment, the first inner sheath thickness 92 is about 0.5 mm. As a specific example, an inner sheath 42 implemented using a homogeneous PA material such as nylon 6 may have a first inner sheath thickness 92 of about 0.5 mm. In another embodiment, the first inner sheath thickness 92 is about 1.3 mm. As a specific example, an inner sheath 42 implemented using a homogeneous PE material may have a first inner sheath thickness 92 of about 1.3 mm. It should be noted that while the thickness of the adhesion layer 26 is nonzero it may be made very thin (having a thickness equal to or lower than 0.2 mm) so as to be much smaller than the first optical core diameter 90 and the first inner sheath thickness 92.

The thickness of the inner sheath 42 may advantageously be made thin in comparison to conventional inner sheath thicknesses. For example, conventional inner sheaths may include multiple layers which increase the thickness of the inner sheath. Conventional inner sheaths used for chemical resistance may employ composite layers made of a PE layer, an aluminum layer, and a PA layer all together. Other conventional inner sheaths may be made very thick in order to use certain materials which may have reduced effectiveness when made thin, especially when used in harsh environments, such as environments where high chemical resistance is important.

The inventors of the present application have found that a single layer of appropriate thickness may be used for the inner sheath 42 of optical cable 300 while still maintaining a high level of chemical resistance. For example, the inventors have exposed PE, nylon 6, and nylon 12 to various compounds such as water, oil (IRM 902), fuel (IRM 903), and toluene at various temperatures, as already mentioned above. The inventors have determined, among other results, that a relatively thin layer of polyamide, for example nylon 6 or nylon 12, may be used to protect a metal tube in harsh chemical environments. For example, the thin layer of nylon 6 may range from a thickness of about 0.3 mm to about 1.0 mm. Based on the test results, an inner sheath implemented using a homogeneous PE layer is less efficient in providing protection in harsh chemical environments, particularly environments where oil and gas are present.

Still referring to FIG. 3, the armor layer 46 of optical cable 300 has an armor layer thickness 96. The armor layer thickness 96 may be dependent on the mechanical requirements of a given application. In cases where armor layer 46 is implemented using a single layer of round wires 34, the diameter of the round wires 34 may determine the value of armor layer thickness 96. In various embodiments, the armor layer thickness 96 is between about 0.5 mm and about 3.6 mm. In one embodiment, the armor layer thickness 96 is about 1.0 mm. For certain applications where very high mechanical strength is desired, armor layer 46 may be implemented using multiple layers. Armor layer thickness 96 may exceed 3.6 mm for certain applications.

The outer sheath 48 has an outer sheath thickness 97. The outer sheath thickness 97 may depend on various desired protection levels such as chemical resistance, heat resistance, flame retardancy, circuit integrity, mechanical stability, and others. The outer sheath thickness 97 is between about 1.0 mm and about 5.0 mm in various embodiments. In one embodiment, the outer sheath thickness 97 is 2.2 mm. In another embodiment, the outer sheath thickness 97 is about 3.0 mm.

The optical cable 300 has a first optical cable diameter 399 which depends on the combination of first optical core diameter 90, first inner sheath thickness 92, armor layer thickness 96, and outer sheath thickness 97. In various embodiments, the first optical cable diameter 399 is between 5 mm and 25 mm and ranges from about 5.6 mm to about 21 mm in some embodiments. In one embodiment, the first optical cable diameter 399 is about 12.5 mm for an optical cable 300 including 48 optical fibers.

Since the first optical cable diameter 399 is often primarily dependent on the number of optical fibers 10, it may be useful to consider the ratio of the number of included optical fibers to the optical cable diameter. For example, in the preceding example of a first optical cable diameter 399 of 12.5 mm for an optical cable 300 including 48 optical fibers, the fiber/diameter ratio is about 3.84 fibers/mm. In general, a higher fiber/diameter ratio indicates a smaller cable and may be desirable in applications for the space devoted to cabling is limited. A table listing various exemplary optical cable diameters and corresponding numbers of optical fibers is shown below in Table I.

The first optical cable diameter 399 may be much thinner for a given number of optical fibers 10 than conventional optical cables. In the above example, an optical cable including 48 optical fibers has a fiber/diameter ratio of about 3.48 fibers/mm. Conventional optical cables have a fiber/diameter ratio that is much lower. For example, as previously described in reference to FIG. 1, a conventional optical cable including 36 optical fibers typically has a fiber/diameter ratio of 1.81 fibers/mm. In contrast, embodiments of the present can achieve fiber/diameter ratio greater than 3 fibers/mm and between about 3 fibers/mm to about 8 fibers/mm.

A further advantage of the cable of the present disclosure may be the amount of organic materials contained therein, such amount being largely reduced as compared with a conventional cable. Consequently, the smoke performance and the flame performance may be significantly improved. As a specific example, a cable of the present disclosure has been made that has a transmittivity >90% (98% with a 48 optical fiber cable, and 95% with a 96 optical fiber cable, both having a LS0H outer layer) under smoke test according to IEC 61034-2 (2005), and has successfully passed flame propagation tests according to IEC 60332-1-2 (2004), IEC 60332-3-24 (2000) Cat C, and 60332-3-22 (2009) Cat A.

A cable according to the present disclosure, containing up to 96 optical fibers and having an LS0H outer layer has been classified B2ca-s1a,d2,a1 CPR Class according to Commission Delegated Regulation (EU) 2016/364 of 1 Jul. 2015.

Figure 4:
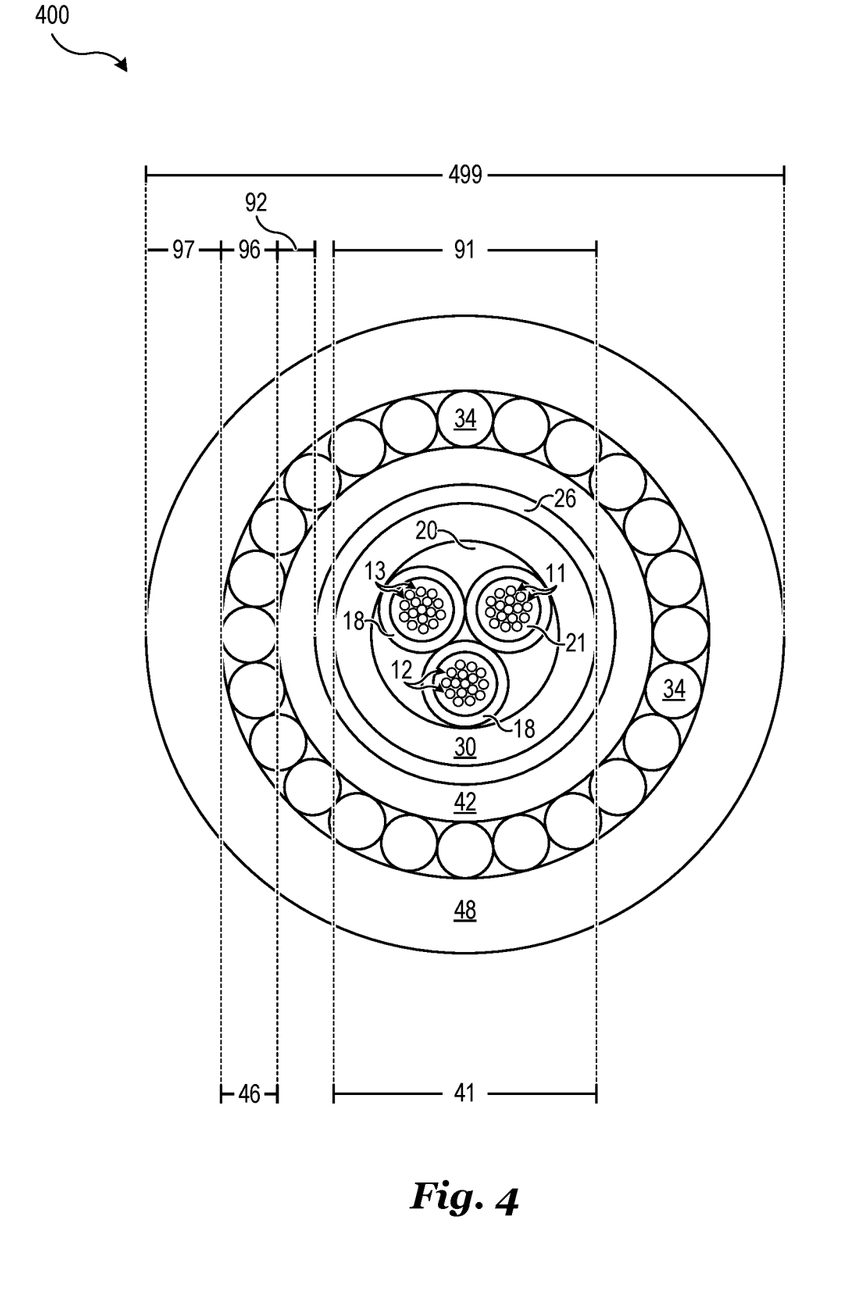
FIG. 4 illustrates an exemplary optical cable including a single layer inner sheath directly adjacent to a sealed metal tube containing two or more fiber tubes each containing a plurality of optical fibers in accordance with an embodiment of the invention.

FIG. 4 illustrates an exemplary optical cable including a single layer inner sheath directly adjacent to a sealed metal tube containing two or more fiber tubes each containing a plurality of optical fibers in accordance with an embodiment of the invention.

Referring to FIG. 4, an optical cable 400 includes an optical core 41, an inner sheath 42, an armor layer 46, and an outer sheath 48. The optical cable 400 may be similar to optical cable 300 as previously described in reference to FIG. 3 except for the inclusion of optical core 41 which includes a multiple set of optical fibers contained within fiber tubes 18. Similarly labeled elements may be as previously described and will not be described here in the interest of brevity.

The optical core 41 may include any number of fiber tubes 18, each containing a set of optical fibers 10. The fiber tubes 18 may comprise a polymer material. In various embodiments, the fiber tubes 18 include a polyester material and are implemented using a thermoplastic polyester material in one embodiment. The fiber tubes 18 may be configured to organize the optical fibers 10 within the optical core 41. The fiber tubes 18 may also provide additional mechanical stability and confine an optional fiber tube filler material 21. The fiber tube filler material 21 may be a gel material similar to fill material 20, for example. In the cable configuration of FIG. 4, a silicone based fiber tube filler material 21 can be employed.

Respective sets of optical fibers 10 may be the same or different from other sets of optical fibers 10. A set of optical fibers 10 may be a single optical fiber 10 in some embodiments. There is not theoretical limit to the quantity of optical fibers 10 in a set of optical fibers. However, practical considerations may limit the number of optical fibers 10 in a single fiber tube 18. As illustrated in FIG. 4, optical core 41 may include three fiber tubes 18 containing first, second, and third sets of optical fibers 11, 12, 13. In one embodiment, each of the sets of optical fibers 11, 12, 13 consists of twelve optical fibers 10. In other embodiments, some or all of the sets of optical fibers 11, 12, 13 consist of more or less than twelve optical fibers 10.

The optical core 41 has a second optical core diameter 91 which may be similar or different from the first optical core diameter 90 of optical cable 300. For example, due to the addition of fiber tubes 18, the second optical core diameter 91 may be larger than first optical core diameter 90 for a given number of optical fibers 10, but this is not necessarily true for all cases. As a result, the second optical cable diameter 499 of optical cable 400 may be larger than the first optical cable diameter 399 of optical cable 300 for a given number of optical fibers 10, but again, this is merely a general guideline rather than a strict requirement.

Figure 5:
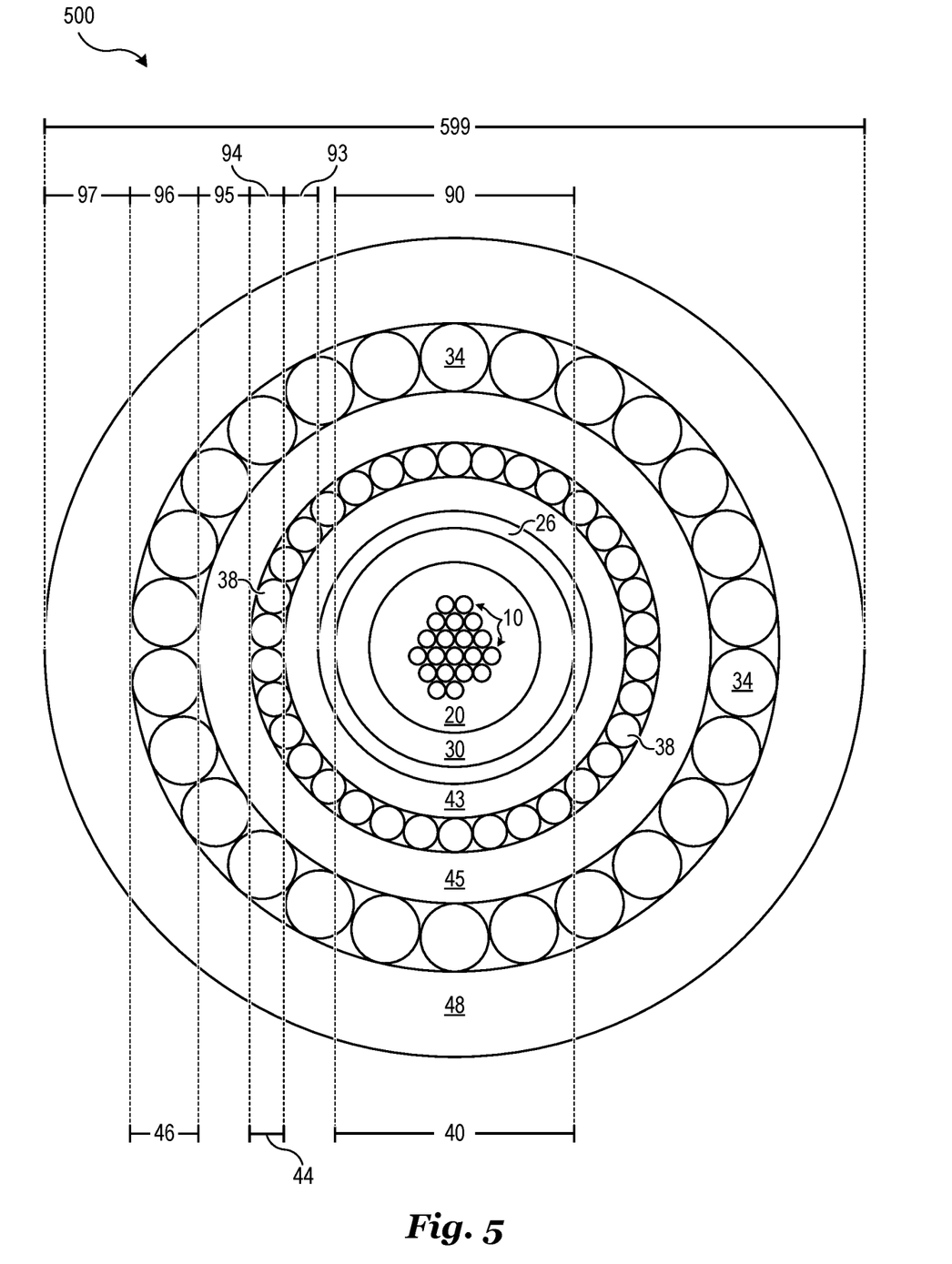
FIG. 5 illustrates an exemplary hybrid cable including a single layer inner sheath directly adjacent to a sealed metal tube containing a plurality of optical fibers as well as an electrically conductive layer in accordance with an embodiment of the invention.

FIG. 5 illustrates an exemplary hybrid cable including a single layer inner sheath directly adjacent to a sealed metal tube containing a plurality of optical fibers as well as an electrically conductive layer in accordance with an embodiment of the invention.

Referring to FIG. 5, a hybrid cable 500 includes an optical core 40, a hybrid inner sheath 43, an armor layer 46, and an outer sheath 48. The hybrid cable 500 may be similar to embodiment optical cables such as optical cable 300 as previously described in reference to FIG. 3 except that hybrid cable 500 includes a conductive layer 44 disposed between a hybrid inner sheath 43, made of PA or PE, and an intermediate sheath 45, made of PE or ceramifying silicone rubber, insulating the conductive layer 44 from the armor layer 46. Similarly labeled elements may be as previously described and will not be described here in the interest of brevity.

The hybrid cable 500 may be configured to feed electrical signals and/or power using conductive layer 44. The electrical signals and/or power may be either direct current (DC) or alternating current (AC). For example, the hybrid cable 500 may carry direct current (DC) at 48V at most, and alternate current (AC) at 380V at most, thus qualifying as a low voltage cable. In some cases, the armor layer 46 may be grounded and utilized as a return path for a power feeding system using hybrid cable 500. In various embodiments, conductive layer 44 is implemented using a plurality of electrically conductive wires 38.

In some embodiments, the electrically conductive wires 38 have a round, solid cross-section. In one embodiment, the electrically conductive wires 38 are implemented using elemental copper (Cu). In another embodiment, the electrically conductive wires 38 are implemented using elemental aluminum (Al). The material composition of electrically conductive wires 38 is not limited to elemental metals and may also be formed from metal alloys, and the like.

The hybrid inner sheath 43 may be similar to inner sheath 42 as previously described. Alternatively, hybrid inner sheath 43 may be different to account for electrical considerations of conductive layer 44. The thickness and material composition of optical core 41 may be dependent on electrical isolation requirements of the optical core 41. For example, conventional hybrid cables may utilize multilayered inner sheaths or thick homogeneous PE layers to provide electrical isolation between a conventional conductive layer and a conventional optical core.

Therefore, it may not be immediately apparent to one of ordinary skill in the art whether a thin single layer inner sheath implemented using a material other than a PE material will be sufficient to provide the require electrical isolation. The inventors of the present application have performed tests to verify that thin single layer inner sheaths implemented using alternative materials such as polyamide (PA) materials provide sufficient electrical isolation between an optical core and a conductive layer. In one embodiment, the hybrid inner sheath 43 comprises nylon 6. A possible benefit of hybrid cable 500 is that hybrid inner sheath 43 may be made thinner than conventional inner sheaths as provided by CEI EN 50363-0 (2006) while still maintaining electrical isolation of conductive layer 44. The thickness of this layer depends on the level of isolation required by the specific current transported. As an example, for a 12 or 24V DC, a 0.5 mm-thick inner sheath 43 shall be sufficient.

In various embodiments, intermediate sheath 45 comprises a PE material such as HDPE. In other embodiments, especially when fire resistance is sought, intermediate sheath 45 may comprises a PE material and fiber glass or mica tape(s), or fiber glass or mica tape(s) alone, or a ceramifying silicone rubber In addition to similarly labeled dimensions which may be as previously described, hybrid cable 500 includes a second inner sheath thickness 93, a conductive layer thickness 94, and an intermediate sheath thickness 95. The second inner sheath thickness 93 may be similar to the first inner sheath thickness 92 as previously described with the added possible consideration of electrical isolation between the optical core 40 and conductive layer 44. The intermediate sheath thickness 95 may be similar to the previously described second inner sheath thickness 93. However, there is no strict requirement that the intermediate sheath thickness 95 be the same, greater than, or less than second inner sheath thickness 93 for a given application.

In various embodiments, the conductive layer thickness 94 is between 0.5 mm and 6 mm and ranges from about 0.6 mm to 3.6 mm in some embodiments. For example, the full range conductors may be used from 85 $mm^2$ (AWG 3/0) to 2.08 $mm^2$ (AWG 14). In one embodiment, the conductive layer thickness 94 is about 0.6 mm. In another embodiment, the conductive layer thickness 94 is about 1 mm. For example, if conductive layer 44 is implemented using 20 copper (Cu) wires with a 1 mm diameter, the copper cross-sectional area may be about 15 $mm^2$.

It should be noted the material composition of conductive layer 44 may impact the required cross-sectional area of conductive layer 44. For example, a conductive layer 44 that is implemented using aluminum may require aluminum wires that have a diameter about 1.65 times larger than an electrically equivalent conductive layer 44 implemented using copper wires.

The hybrid cable 500 has a first hybrid cable diameter 599 which depends on the combination of first optical core diameter 90, second inner sheath thickness 93, conductive layer thickness 94, intermediate sheath thickness 95, armor layer thickness 96, and outer sheath thickness 97. In various embodiments, the first hybrid cable diameter 599 is between 7 mm and 35 mm and ranges from about 7.4 mm to about 31.2 mm in some embodiments. In one embodiment, the first hybrid cable diameter 599 is about 15.5 mm for a hybrid cable 500 including 48 optical fibers.

As with previous embodiment optical cables, the first hybrid cable diameter 599 of hybrid cable 500 may be significantly smaller than conventional hybrid cable diameters. Similarly, hybrid cable 500 may be uniquely suitable for harsh environments and may meet a large number of protection standards.

Figure 6:
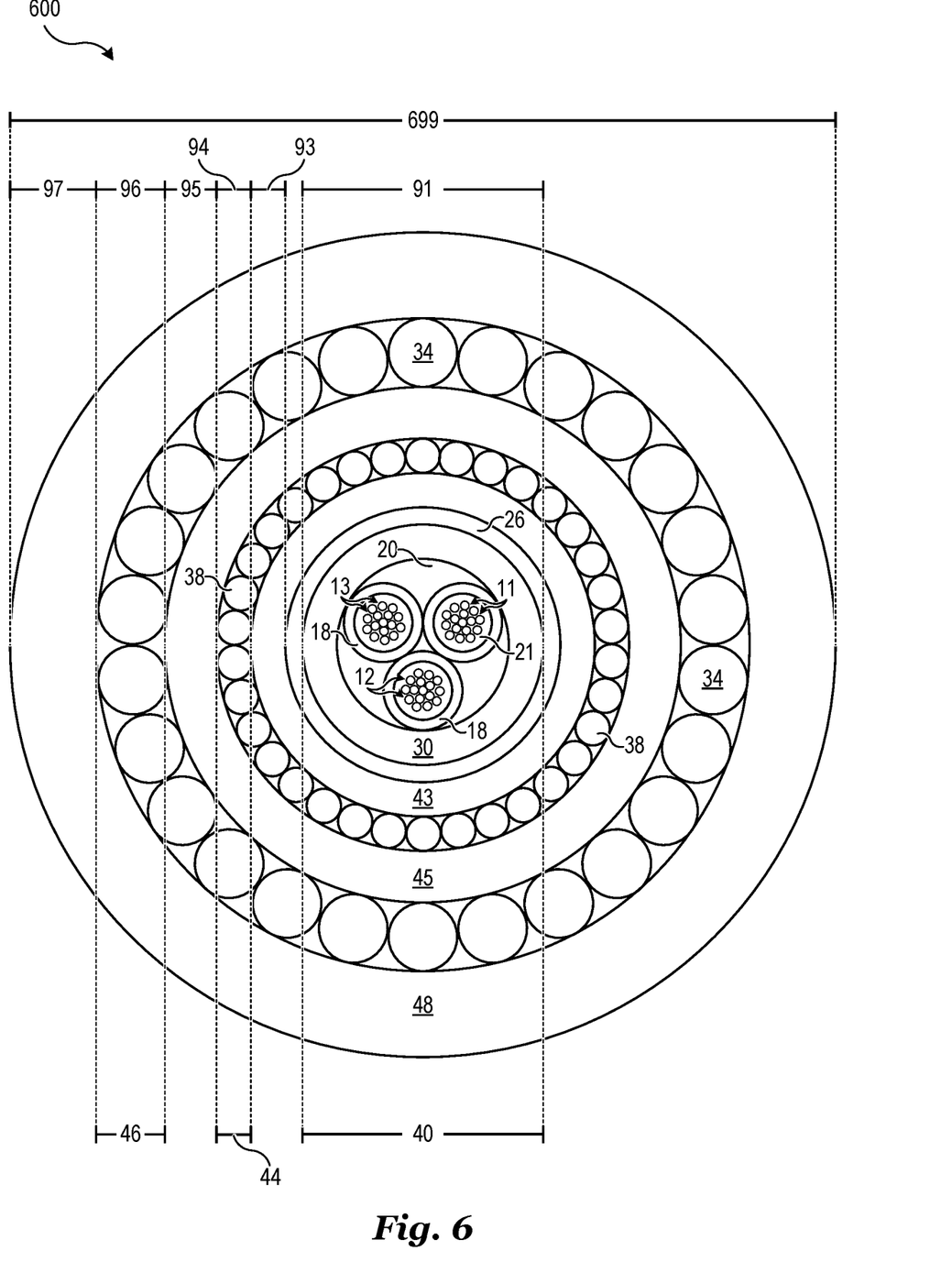
FIG. 6 illustrates an exemplary hybrid cable including a single layer inner sheath directly adjacent to a sealed metal tube containing two or more fiber tubes each containing a plurality of optical fibers as well as an electrically conductive layer in accordance with an embodiment of the invention.

FIG. 6 illustrates an exemplary hybrid cable including a single layer inner sheath directly adjacent to a sealed metal tube containing two or more fiber tubes each containing a plurality of optical fibers as well as an electrically conductive layer in accordance with an embodiment of the invention.

Referring to FIG. 6, a hybrid cable 600 includes an optical core 41, a hybrid inner sheath 43, a conductive layer 44, an intermediate sheath 45, an armor layer 46, and an outer sheath 48. The hybrid cable 600 may be similar to hybrid cable 500 as previously described in reference to FIG. 5 except for the inclusion of an optical core 41 which includes multiple sets of optical fibers contained within fiber tubes 18. The optical core 41 of hybrid cable 600 may be as previously described, such as in reference to FIG. 4, for example. Similarly labeled elements may be as previously described and will not be described here in the interest of brevity.

As before, the second optical core diameter 91 may be similar or different from the first optical core diameter 90 of hybrid cable 500, for example. As a result, the second hybrid cable diameter 699 of hybrid cable 600 may be larger than the first hybrid cable diameter 599 of hybrid cable 500 for a given number of optical fibers 10. As previously described, this is merely a general guideline rather than a strict requirement.

It should be noted that in some embodiment cables, the armor layer may advantageously have a decreased thickness or be removed entirely because of the metal tube of the optical core. For example, a metal tube of sufficient thickness may improve the structural properties of the optical core so that a thinner armor layer or no armor layer may be used to achieve the same overall properties. This may beneficially result in a reduction of the overall thickness of embodiment cables while maintaining desirable structural properties and levels of fire, water, and chemical protection when compared to conventional cables.

Figure 7:
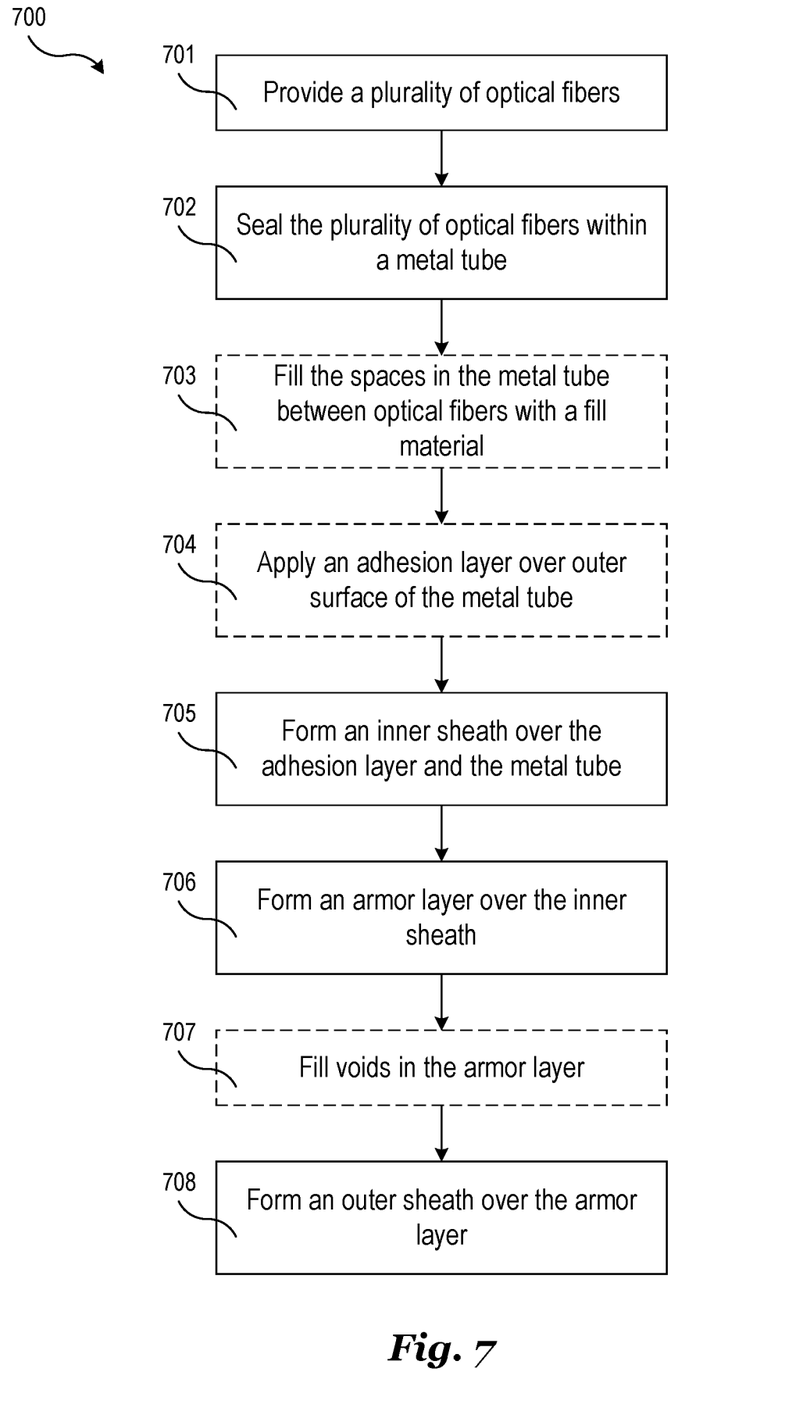
FIG. 7 illustrates an exemplary method of fabricating an optical cable in accordance with an embodiment of the invention.

FIG. 7 illustrates an exemplary method of fabricating an optical cable in accordance with an embodiment of the invention. The method 700 may be used to fabricate any of the optical cables or hybrid cables described herein. For example, method 700 may be used to fabricate embodiment optical cables as described in reference to FIG. 3 such as optical cable 300. The following steps of method 700 may be performed in any order and are not intended to be exhaustive. Additional steps may be added to method 700 and one or more steps may be removed from method 700 as may be apparent to one of ordinary skill in the art. The steps of method 700 are not necessarily performed sequentially and any number of steps of method 700 may be performed concurrently.

Step 701 of fabricating the optical cable includes providing a plurality of optical fibers which are then sealed within a metal tube in step 702. The spaces in the metal tube between optical fibers are optionally filled for a fill material in step 703. The fill material may be applied before, during, or after step 702. In one embodiment, steps 702 and 703 are performed concurrently.

The method 700 of fabricating the optical cable further includes an optional step 704 of applying an adhesion layer over the outer surface of the metal tube. For example, the adhesion layer may be a primer that prepares the outer surface of the metal tube for direct bonding with a subsequent layer. The outer surface of the metal tube is a major outer surface of the metal tube and the adhesion layer may be applied so that the major outer surface is substantially entirely covered by the adhesion layer and a subsequent bonded layer such as an inner sheath.

Step 705 of fabricating the optical cable includes forming an inner sheath over the adhesion layer and the outer surface of the metal tube. If step 704 is omitted, then step 705 includes forming the inner sheath over only the outer surface of the metal tube. The inner sheath may be formed using an extrusion process. If the inner sheath is a multilayer inner sheath, then a co-extrusion process may be used. If the inner sheath comprises a mixture of materials then a compound extrusion process may be used.

Step 706 of fabricating the optical cable includes forming an armor layer over the inner sheath. The armor layer may be formed by winding a plurality of strength components in to form closed helix around the inner sheath. As previously described, the strength components may be round metal wires, trapezoidal metal wires, polymer wires, dielectric rods, and the like. Alternatively, the armor layer may be formed from corrugated metal tape which may be applied longitudinally. In some embodiments, the armor layer comprises multiple layers is formed in several steps.

The method 700 of fabricating the optical cable further includes an optional step 707 of filling the voids in the armor layer with a fill material. Step 708 includes forming an outer sheath over the armor layer and the armor fill material if optional step 707 is included. The outer sheath may be formed using an extrusion process. Similar to step 705, the outer sheath may also be formed using a coextrusion or compound extrusion process where applicable.

Figure 8:
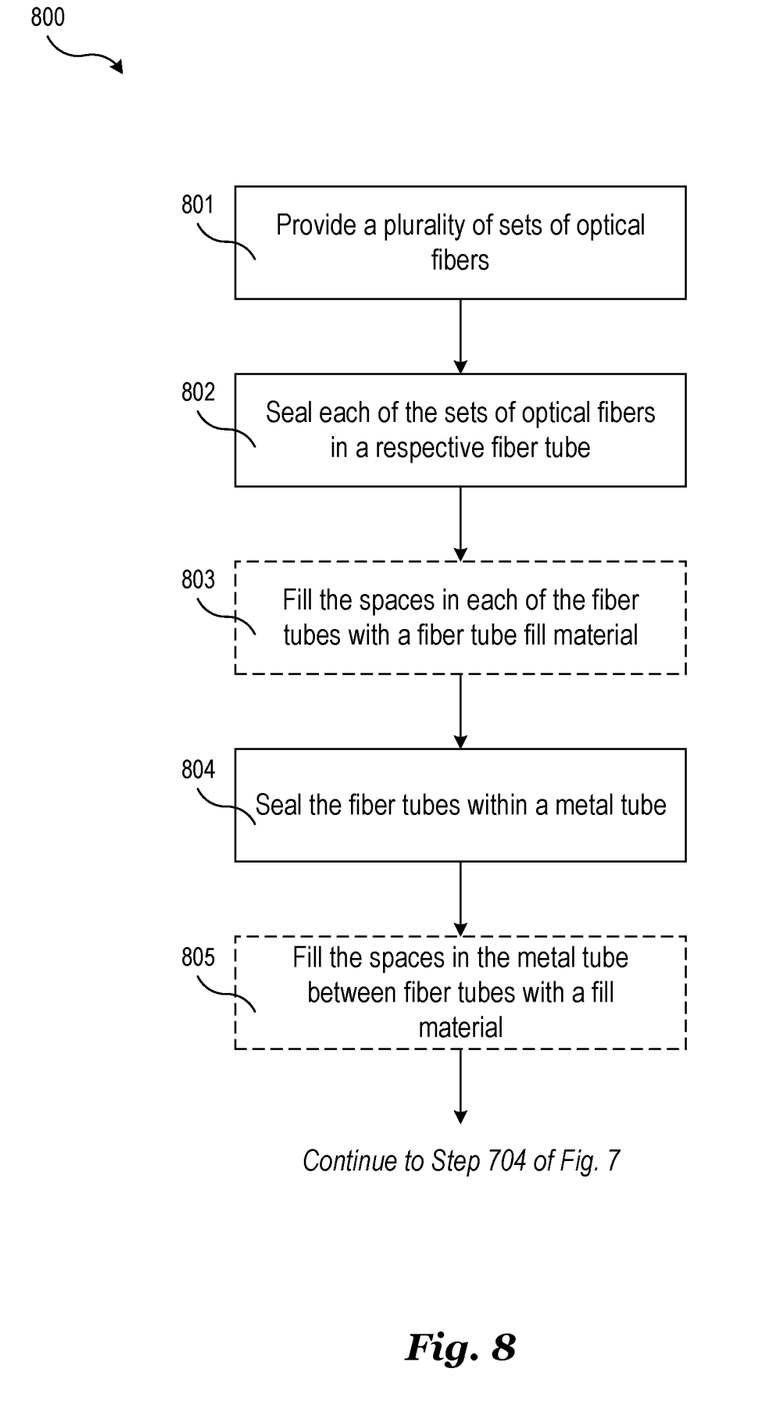
FIG. 8 illustrates another exemplary method of fabricating an optical in accordance with an embodiment of the invention.

FIG. 8 illustrates another exemplary method of fabricating an optical in accordance with an embodiment of the invention. The method 800 may be used to fabricate any of the optical cables or hybrid cables described herein. For example, method 800 may be used to fabricate embodiment optical cables as described in reference to FIG. 4 such as optical cable 400. The following steps of method 800 may be performed in any order and are not intended to be exhaustive. Additional steps may be added to method 800 and one or more steps may be removed from method 800 as may be apparent to one of ordinary skill in the art. The steps of method 800 are not necessarily performed sequentially and any number of steps of method 800 may be performed concurrently.

Step 801 of fabricating the optical cable includes providing a plurality of sets of optical fibers when are then sealed in respective fiber tubes in step 802. The spaces between optical fibers in each of the fiber tubes may optionally be filled with a fiber tube fill material in step 803. The fiber tubes may be formed using an extrusion process. Steps 802 and 803 may be performed concurrently in some embodiments. In one embodiment, steps 802 and 803 are performed concurrently using a co-extrusion process.

Step 804 of fabricating the optical fiber includes sealing the fiber tubes within a metal tube. An optional step 805 includes filling the spaces between fiber tubes with a fill material. As with steps 702 and 703 of method 700, steps 804 and 804 may be performed in any order and are performed concurrently in one embodiment. The remaining steps of method 800 mirror steps 704-708 of method 700.

Figure 9:
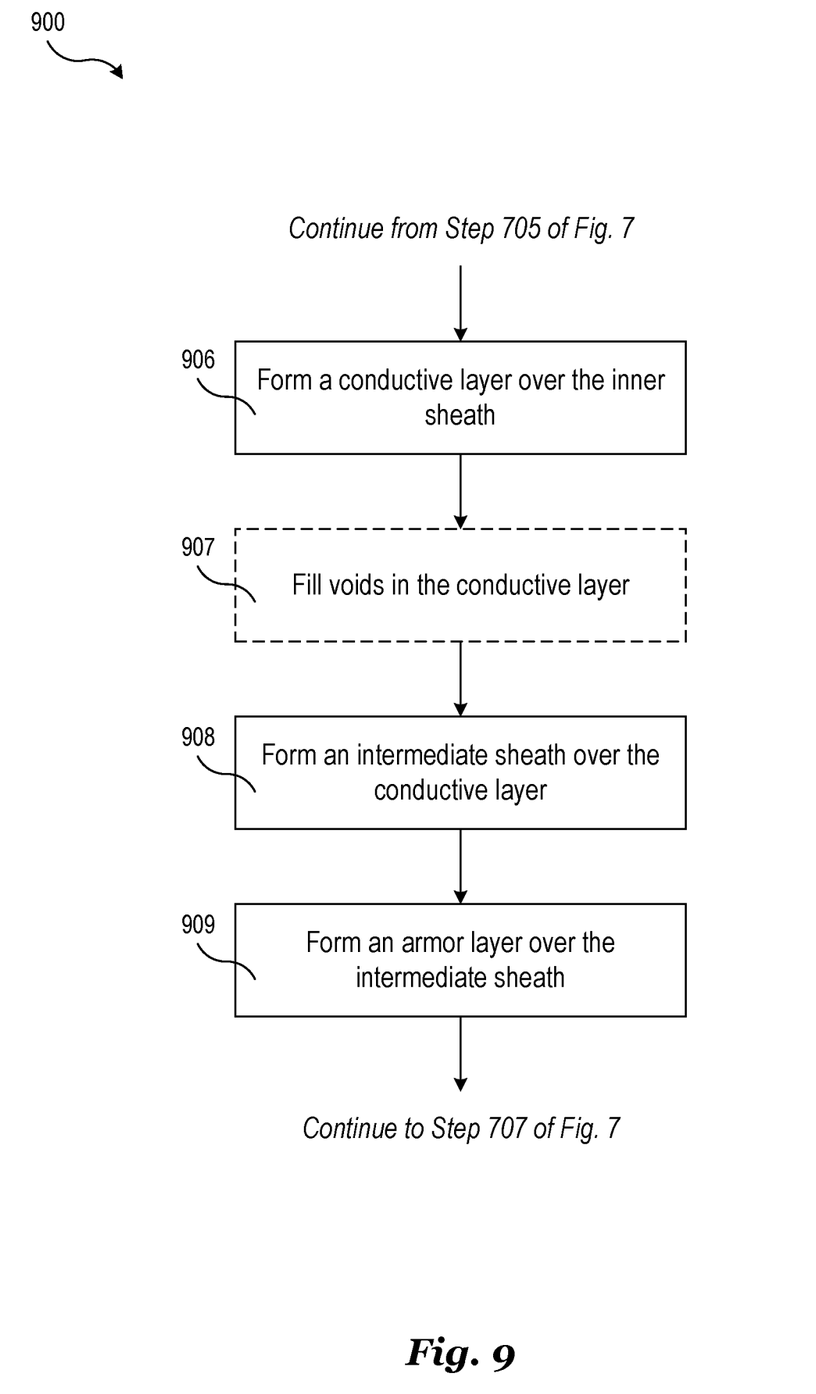
FIG. 9 illustrates an exemplary method of fabricating a hybrid cable in accordance with an embodiment of the invention.

FIG. 9 illustrates an exemplary method of fabricating a hybrid cable in accordance with an embodiment of the invention. The method 900 may be used to fabricate any of the hybrid cables described herein. For example, method 900 may be used to fabricate embodiment hybrid cables as described in reference to FIGS. 5 and 6 such as hybrid cable 500 and hybrid cable 600. The following steps of method 900 may be performed in any order and are not intended to be exhaustive. Additional steps may be added to method 900 and one or more steps may be removed from method 900 as may be apparent to one of ordinary skill in the art. The steps of method 900 are not necessarily performed sequentially and any number of steps of method 900 may be performed concurrently.

The first steps of method 900 mirror steps 701-705 of method 700. Alternatively, steps 801-805 of method 800 may be performed followed by steps 704 and 705 of method 700. Step 905 is performed after performing step 705 in either case and includes forming a conductive layer over the inner sheath. The conductive layer may be formed in a manner similar to the armor layer as previously described. An optional step 907 includes filling the voids in the conductive layer with a fill material.

Step 908 of forming the hybrid cable includes forming an intermediate sheath over the conductive layer. The intermediate sheath may be formed in a manner similar to the inner sheath as previously described. Step 909 includes forming an armor layer over the intermediate sheath and is similar in concept to step 706 of method 700 except that the armor layer is being formed over a different sheath. The remaining steps of method 900 mirror steps 707-708 of method 700.

Table I in the following summarizes several cable diameters and fiber/diameter ratios which may be associated with a specific number of included optical fibers. For example, as described in the above embodiments, some variation in the chosen thicknesses of each of the layers is possible due to specific design considerations. Table I summarizes possible ranges of diameters (and consequently fiber/diameter ratios) corresponding to the number of included optical fibers. The values presented in Table I represent several exemplary configurations of embodiment optical cables and embodiment hybrid cables. However, the given values are not intended to be limiting as it is conceivable that the values may be outside of these ranges in practice.

TABLE I

| Type | No. of Fibers. | Possible Diameters Min. | Possible Diameters Max. | Possible Fiber/Diameter Ratios Max. | Possible Fiber/Diameter Ratios Min. |
|---|---|---|---|---|---|
| Optical | 12 | 5.6 mm | 18.2 mm | 2.14 fibers/mm | 0.66 fibers/mm |
|  | 13 to 48 | 7.1 mm | 19.7 mm | 6.76 fibers/mm | 0.66 fibers/mm |
|  | 49 to 96 | 8.4 mm | 21.0 mm | 11.43 fibers/mm | 2.33 fibers/mm |
| Hybrid | 12 | 7.4 mm | 28.4 mm | 1.62 fibers/mm | 0.42 fibers/mm |
|  | 13 to 48 | 8.9 mm | 29.9 mm | 5.39 fibers/mm | 0.43 fibers/mm |
|  | 49 to 96 | 10.2 mm | 31.2 mm | 9.41 fibers/mm | 1.57 fibers/mm |

It should also be noted that, although embodiment cables advantageously provide increased fiber/diameter ratios over conventional cables, some of the possible fiber diameter ratios shown in table 1101 are lower than those of a conventional cable. For some particularly demanding applications, the thicknesses of the various layers of embodiment cables may be increased in order to improve protection and/or structural properties of the cable which may in turn result in a lower fiber/diameter ratio. Therefore, in these demanding applications, embodiment cables may not be thinner than conventional cables, but may provide improved properties over conventional cables.

Example embodiments of the invention are summarized here. Other embodiments can also be understood from the entirety of the specification as well as the claims filed herein.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical cable comprising:
 a plurality of optical fibers sealed within a metal tube, the metal tube being sealed by welding or extrusion;
 a polyamide inner sheath surrounding and directly adjacent to the metal tube, the polyamide inner sheath being a single homogeneous polyamide layer;
 a metal layer surrounding and directly adjacent to the polyamide inner sheath; and
 an outer sheath surrounding the metal layer, the outer sheath comprising an external surface of the optical cable.

2. The optical cable according to claim 1, wherein the metal layer is a single layer of armor disposed between the polyamide inner sheath and the outer sheath.

3. The optical cable according to claim 1, wherein the outer sheath is made of a material selected from a group consisting of a polyvinylchloride (PVC) material and a low smoke zero halogen (LS0H) polymer material.

4. The optical cable according to claim 1, further comprising:
 a single layer of armor disposed over the polyamide inner sheath; and
 an intermediate sheath disposed between the metal layer and the single layer of armor, the metal layer being an electrically conductive layer, wherein the optical cable is configured to transmit optical signals through the plurality of optical fibers, and wherein the optical cable is further configured to conduct electrical current through the electrically conductive layer.

5. The optical cable according to claim 4 wherein the intermediate sheath comprises polyethylene or ceramifying silicone rubber.

6. An optical cable comprising:
 an optical core comprising a metal tube enclosing a plurality of loose optical fibers and configured to resist water penetration;
 a single layer homogeneous polyamide inner sheath disposed over and directly attached to the optical core, the single layer homogeneous polyamide inner sheath being configured to be chemically resistant; and
 an outer sheath surrounding the single layer homogeneous polyamide inner sheath, the outer sheath being configured to be flame retardant.

7. The optical cable according to claim 6 further comprising an armor layer disposed between and physically contacting both the single layer homogeneous polyamide inner sheath and the outer sheath.

8. The optical cable according to claim 6, further comprising:
a conductive layer disposed over and physically contacting the single layer homogeneous polyamide inner sheath;
an armor layer; and
an intermediate sheath disposed between the conductive layer and the armor layer, wherein the optical cable is configured to transmit optical signals through the plurality of loose optical fibers, and wherein the optical cable is further configured to conduct electrical current through the conductive layer.

9. The optical cable according to claim 6, wherein the total quantity of optical fibers enclosed by the metal tube divided by the diameter of the optical cable is greater than 3 fibers/mm.

10. The optical cable according to claim 6, wherein the optical core is sealed to prevent water penetration.

11. The optical cable according to claim 6, wherein the single layer homogeneous polyamide inner sheath surrounds the optical core so that the optical cable is protected from chemicals.

12. The optical cable according to claim 6, wherein the outer sheath comprises one or more of:
a crystalline propylene homopolymer or copolymer;
a copolymer of ethylene with at least one alpha-olefin; and
natural magnesium hydroxide so that the optical cable is fire resistant and flame retardant.

13. A hybrid cable comprising:
a plurality of optical fibers sealed within a metal tube;
a polyamide inner sheath surrounding the metal tube, wherein the polyamide inner sheath is directly attached to the metal tube;
a conductive layer disposed over and physically contacting the polyamide inner sheath;
an intermediate sheath disposed over the conductive layer; and
an outer sheath surrounding the intermediate sheath, wherein the hybrid cable is configured to transmit optical signals through the plurality of optical fibers, and wherein the hybrid cable is further configured to conduct electrical current through the conductive layer.

14. The hybrid cable according to claim 13 further comprising an armor layer disposed between the intermediate sheath and the outer sheath.

15. The hybrid cable according to claim 13, wherein the polyamide inner sheath is a single homogeneous polyamide layer.

16. The hybrid cable according to claim 13, wherein the conductive layer is further configured to transmit electrical power through the hybrid cable.

17. The hybrid cable according to claim 13, wherein the polyamide inner sheath surrounds the metal tube so that the plurality of optical fibers are protected from heat, oil and gasoline.

18. The hybrid cable according to claim 13, wherein the metal tube is sealed so that the plurality of optical fibers are protected from fire.

19. The optical cable according to claim 1, wherein the metal tube is sealed so that the plurality of optical fibers are protected from fire.

20. The optical cable according to claim 1, wherein the polyamide inner sheath surrounds the metal tube so that the plurality of optical fibers are protected from heat, oil and gasoline.

21. The optical cable according to claim 1, wherein the polyamide inner sheath is between about 0.3 mm and 1.0 mm thick.

22. The optical cable according to claim 1, wherein the polyamide inner sheath is directly attached to the metal tube using an adhesion layer.

23. The optical cable according to claim 1, wherein the thickness of the polyamide inner sheath along a radius of the optical cable is between about 0.3 mm and about 1.5 mm.

* * * * *

UNITED STATES PATENT AND TRADEMARK OFFICE
CERTIFICATE OF CORRECTION

Page 1 of 1

PATENT NO. : 10,606,005 B1
APPLICATION NO. : 16/129481
DATED : March 31, 2020
INVENTOR(S) : Josep Maria Martin Regalado It is certified that error appears in the above-identified patent and that said Letters Patent is hereby corrected as shown below:

On the Title Page

Please insert:
--Prior Publication Data
US 2020/0081209 A1 Mar. 12, 2020--.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*